(12) United States Patent
Kury

(10) Patent No.: US 10,428,980 B2
(45) Date of Patent: Oct. 1, 2019

(54) SANITARY LINE ATTACHMENT

(71) Applicant: Neoperl GmbH, Mullheim (DE)

(72) Inventor: Werner Kury, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 15/573,268

(22) PCT Filed: Jun. 4, 2016

(86) PCT No.: PCT/EP2016/000918
§ 371 (c)(1),
(2) Date: Nov. 10, 2017

(87) PCT Pub. No.: WO2017/008870
PCT Pub. Date: Jan. 19, 2017

(65) Prior Publication Data
US 2018/0156366 A1 Jun. 7, 2018

(30) Foreign Application Priority Data
Jul. 14, 2015 (DE) .................... 20 2015 004 919 U

(51) Int. Cl.
*F16L 17/00* (2006.01)
*F16L 19/02* (2006.01)
*E03C 1/086* (2006.01)

(52) U.S. Cl.
CPC .......... *F16L 19/0218* (2013.01); *E03C 1/086* (2013.01)

(58) Field of Classification Search
CPC .............................. F16L 19/0218; E03C 1/086
See application file for complete search history.

(56) References Cited

U.S. PATENT DOCUMENTS

| | | | |
|---|---|---|---|
| 1,157,574 A | 10/1915 | Mueller | |
| 1,917,553 A | 7/1933 | Scholtes | |
| 4,088,327 A | 5/1978 | Bachle | |
| 5,342,096 A * | 8/1994 | Bachle | F16L 19/0212 277/622 |
| 5,525,226 A * | 6/1996 | Brown | F16J 15/061 210/443 |
| 8,616,818 B2 * | 12/2013 | Travis | F16B 43/00 411/371.1 |
| 2008/0012328 A1 | 1/2008 | Stein et al. | |

FOREIGN PATENT DOCUMENTS

| | | | |
|---|---|---|---|
| EP | 1770225 | 4/2007 | |
| GB | 431097 A * | 7/1935 | .......... B65D 39/084 |

* cited by examiner

*Primary Examiner* — Gilbert Y Lee
(74) *Attorney, Agent, or Firm* — Volpe and Koenig, P.C.

(57) ABSTRACT

A sanitary line attachment (1) is provided which is of sleeve-shaped design in at least one front end region (6) and, in the sleeve interior of the sleeve-shaped front end region (6), bears an internal thread (7) for attachment to an adjacent line portion, wherein at least one sealing ring (9) is clamped in a sealing manner between the adjacent line portion and the line attachment. On the ring outer circumference of the sealing ring at least one holding projection (10) protrudes, which holding projection (10) engages in the internal thread (7) in the sleeve interior of the sleeve-shaped front end region (6). The sealing ring (9) is produced from a dimensionally stable and/or inelastic material, and the sealing ring (9) has at least one and preferably at least two indentations (11) which are arranged at a distance from one another on the ring inner circumference and are designed as tool engagement surfaces.

7 Claims, 3 Drawing Sheets

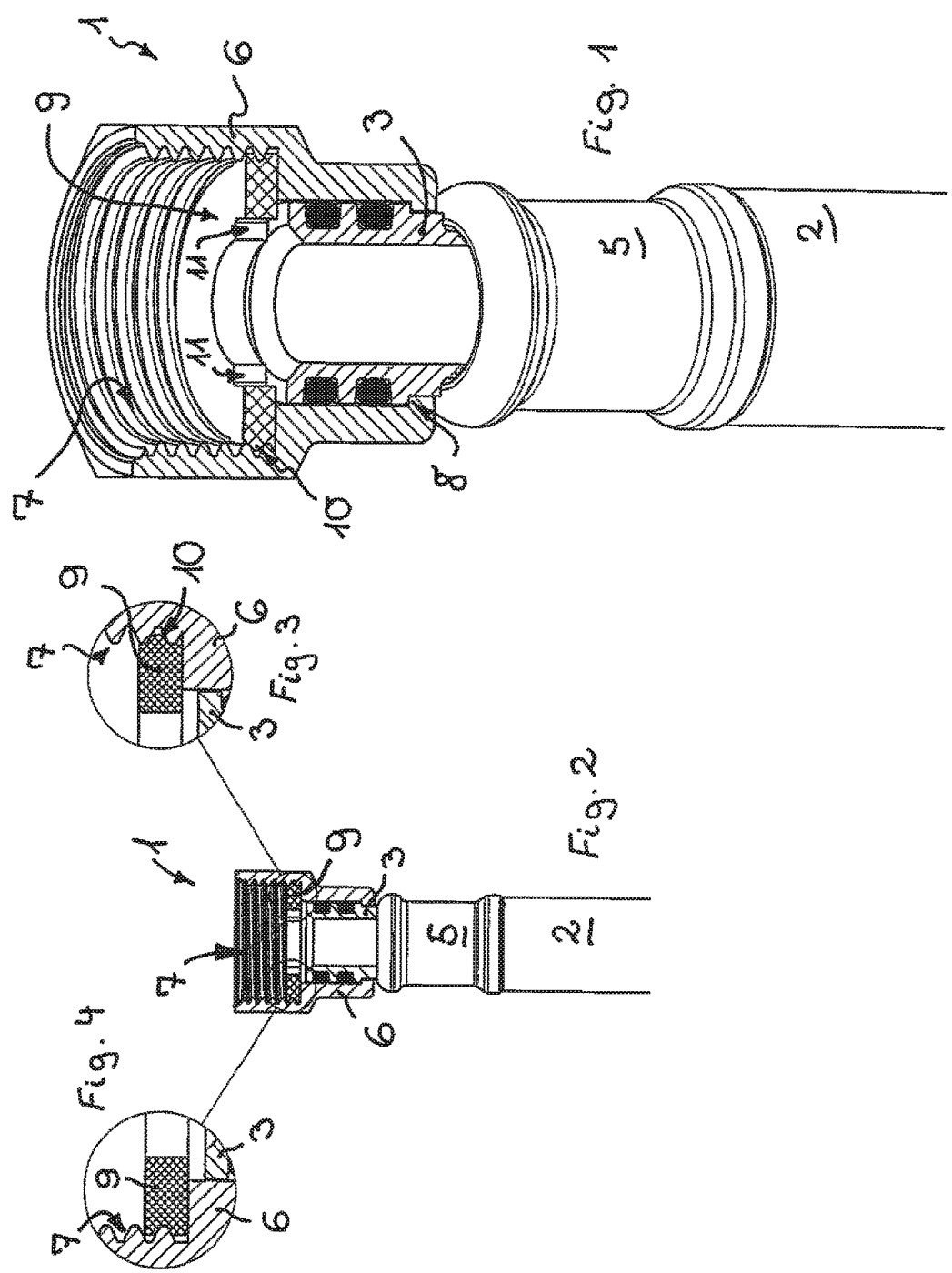

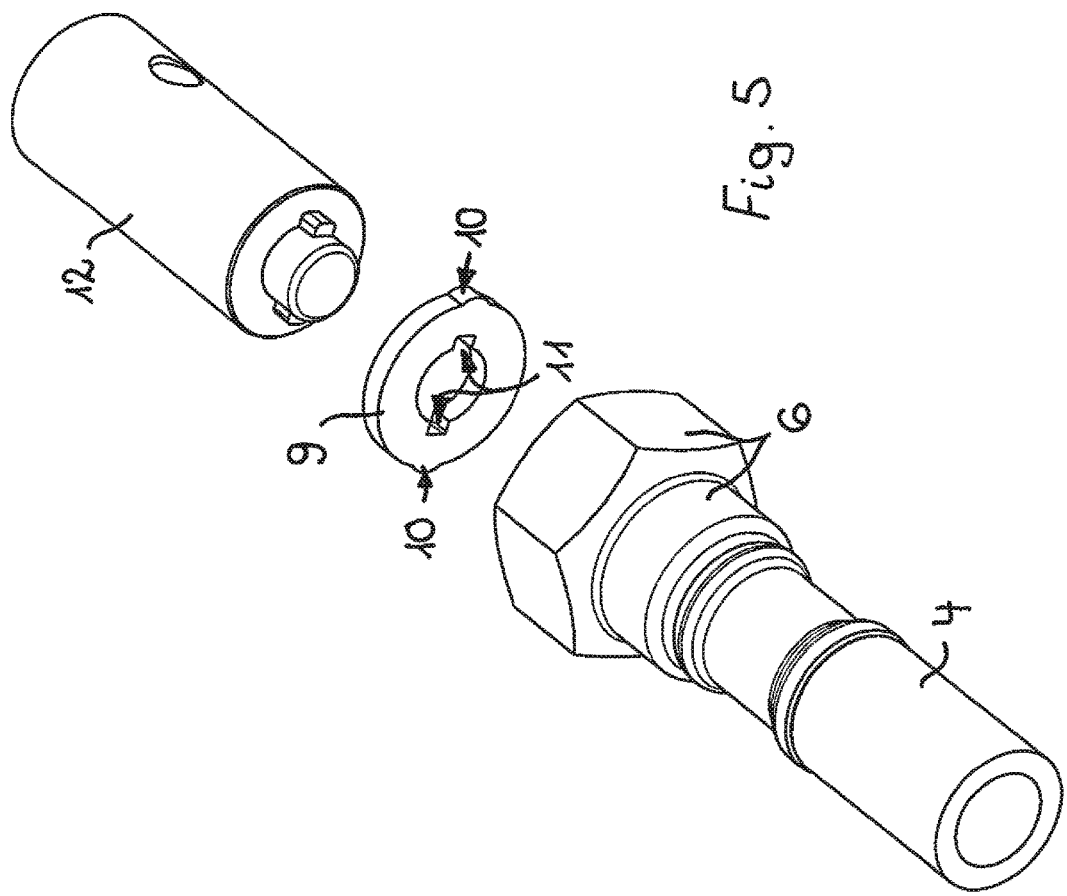

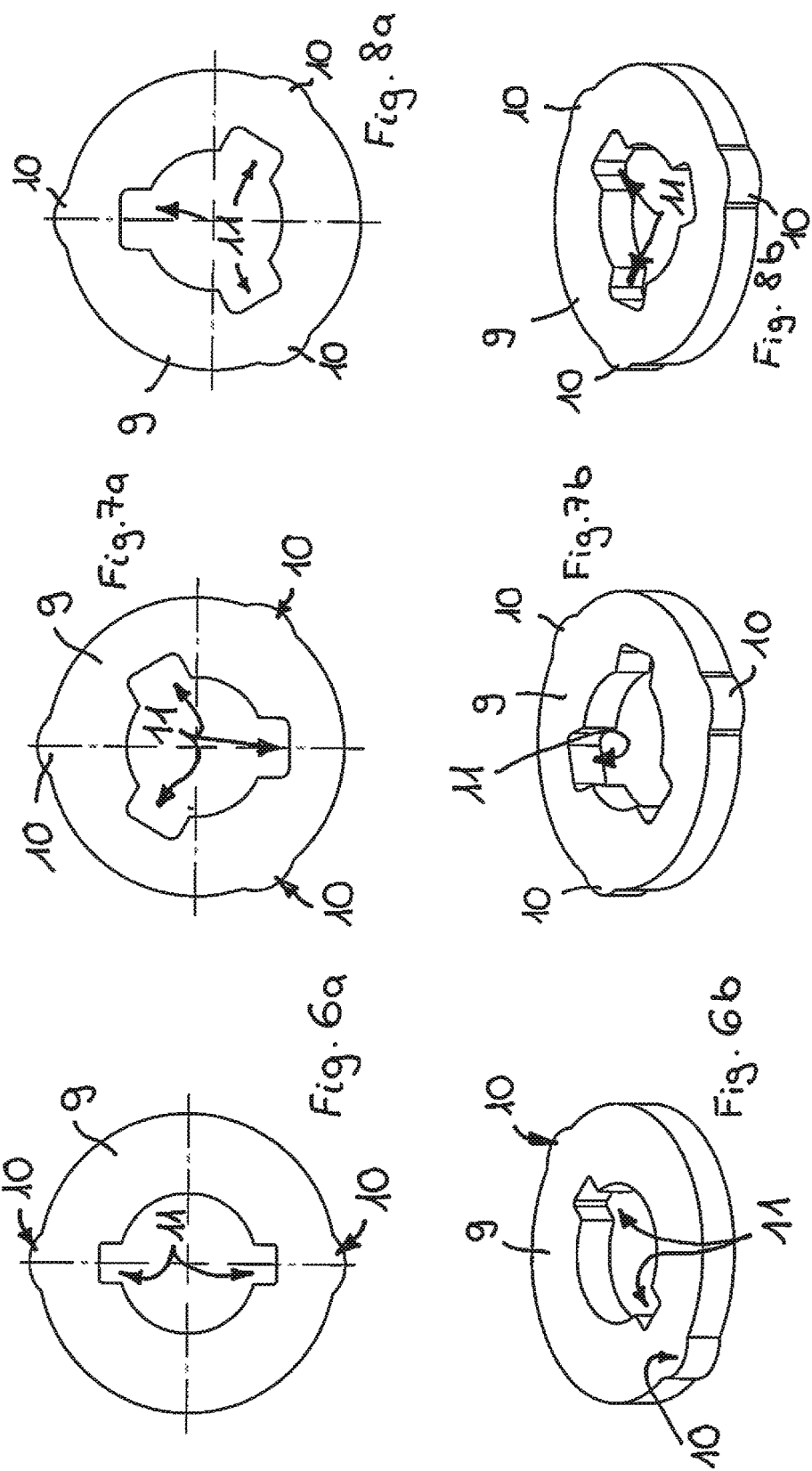

SANITARY LINE ATTACHMENT

BACKGROUND

The invention relates to a sanitary line attachment which is of sleeve-shape design in at least one front end region and, in the sleeve interior of said sleeve-shaped front end region, bears an internal thread for attachment to an adjacent line portion, wherein a sealing ring is provided which is produced from a dimensionally stable and/or inelastic material and is provided for sealing clamping between the line attachment and the adjacent line portion, the ring outer circumference of which sealing ring has at least one protruding holding projection, which holding projection engages in the internal thread in the sleeve interior of the sleeve-shaped front end region, wherein the sealing ring has at least one indentation.

U.S. Pat. No. 4,088,327 A discloses a sanitary line attachment of the type mentioned at the beginning which has a sleeve-shaped attachment piece, in the sleeve interior of which an internal thread is provided. The attachment piece provided for attachment to an adjacent line portion is assigned a sealing ring for sealing clamping between the line attachment and the adjacent line portion. The ring outer circumference of said sealing ring has holding projections which are spaced apart from one another, engage in the internal thread in the sleeve interior of the sleeve-shaped attachment piece and secure the sealing ring there against falling out. The sealing ring used in the previously known line attachment has an indentation which is designed as an aperture in the ring circumference of the sealing ring and permits expansion and constriction of the sealing ring in its sealing ring circumference and therefore adaptation of the sealing ring to the various clear diameters of differently dimensioned attachment pieces.

U.S. Pat. Nos. 1,157,574 A and 1,917,553 A already disclose sanitary line connections which likewise serve for the connection of adjacent line portions. While a sleeve-shaped coupling piece with an internal thread is provided on the one line portion, the adjacent other line portion has a coupling counterpart, which coupling counterpart can be screwed with an external thread into the internal thread of the line portion first mentioned. Provided between the opposite front ends of the interconnectable line portions is a sealing ring which is made from an elastic material and the ring outer circumference of which has a plurality of holding projections which are spaced apart from one another in the circumferential direction and engage in the internal thread in the sleeve interior of the sleeve-shaped first line portion.

EP 1 770 225 B1 already discloses a sanitary line attachment which is of sleeve-shaped design in at least one front end region, wherein an internal thread is provided in the sleeve interior of said sleeve-shaped front end region, said internal thread serving for attachment to an inflow- or outflow-side line portion. A sealing ring is clamped in a sealing manner in the front end region between the previously known line attachment and the adjacent line portion, on the outer circumference of which sealing ring a plurality of holding projections protrude, said holding projections being spaced apart at uniform distances from one another and engaging in the internal thread in the sleeve interior of the sleeve-shaped front end region. Said holding projections protrude on the outer circumference of the sealing ring in such a manner that the holding projections can engage in the internal thread and can be fixedly clamped there. In this manner, the sealing ring and, with the latter, the components additionally provided in the sleeve interior of the previously known line attachment are secured in such a manner that said components cannot be unintentionally released, for example due to transport-induced vibrations, but nevertheless can be easily separated from one another when required.

However, sealing rings made from elastic material are less readily suitable in various application sectors. Some of such application sectors require the use of fiber seals. Comparably configured fiber seals cannot, for example, be pressed into a sleeve-shaped union nut because of the little elasticity and the high dimensional stability of the material which is used since the holding projections on the ring outer circumference of such a sealing ring would break off in the process. Such fiber seals therefore have had to be added separately up to now or connected to an attachment tube during the storage and the transport of the latter. However, there is the risk here of said ring seals being overlooked by the user or being fitted incorrectly or even not at all.

SUMMARY

It is therefore in particular the object to provide a sanitary line attachment of the type mentioned at the beginning which excludes the risk of not being fitted or being fitted incorrectly even if the provided use requires the use of a dimensionally stable and/or inelastic seal.

In the case of sanitary line attachment of the type mentioned at the beginning, this object is achieved according to the invention in particular in that the sealing ring has at least two indentations which are designed as tool engagement surfaces and are arranged at a distance from one another on the ring inner circumference.

The line attachment according to the invention is of sleeve-shaped design in at least one front end region. In said at least one sleeve-shaped front end region, the line attachment bears an internal thread which serves for attachment to an adjacent line portion. In order to seal the separating plane between the line attachment according to the invention and the adjacent line portion, at least one sealing ring is clamped in a sealing manner in said front end region, on the ring outer circumference of which sealing ring at least one holding projection protrudes. With said holding projection, the sealing ring used according to the invention engages in the internal thread in the sleeve interior of the at least one sleeve-shaped front end region. The sealing ring according to the invention is produced from a dimensionally stable and/or inelastic material which does not permit the sealing ring to be pressed into the sleeve-shaped front end region. The sealing ring according to the invention therefore has at least two indentations which are designed as tool engagement surfaces for a screwdriver or similar screwing-in tool and are arranged at a distance from one another on the ring inner circumference. The sealing ring can be screwed into the internal thread in the sleeve-shaped front end region of the line attachment with the aid of said screwing-in tool. After screwing into the internal thread, even the sealing ring produced from dimensionally stable and/or inelastic material forms a self-holding seal there which can already be installed by the manufacturer, and therefore it is effectively prevented that the installer fits said seal incorrectly or even not at all.

In order to facilitate the screwing of the sealing ring into the sleeve-shaped front end region of the line attachment according to the invention and to promote the positionally correct and secure support of the sealing ring in the sleeve-shaped front end region, it is advantageous if the sealing ring has a thickness greater than a thread pitch of the internal thread and preferably greater than/equal to two thread pitches of the internal thread. In this embodiment, all of the holding projections provided on the ring outer circumference of the sealing ring engage completely in at least one of the thread pitches.

In order to bring about a tight connection between the line attachment according to the invention and the adjacent line portion, it is advantageous if the sealing ring is designed as a fiber seal or is produced from a fiber material.

In a preferred embodiment according to the invention, the ring outer circumference of the sealing ring is cuttable into the internal thread at least with the at least one holding projection.

In order to promote the fixed support of the sealing ring on the internal thread and to promote a positionally correct and virtually wobble-free connection of the sealing ring in the internal thread, it is advantageous if at least two and preferably three holding projections are provided on the ring outer circumference of the sealing ring.

In this case, in a preferred embodiment according to the invention, the holding projections are arranged distributed at uniform distances around the ring outer circumference of the sealing ring.

In a preferred use of the line attachment according to the invention, said line attachment is designed as a tube attachment with a union nut, and the union nut forms the sleeve-shaped front end region of the line attachment.

Developments according to the invention emerge from the claims in conjunction with the drawing and the description of the figures. The invention is described in more detail below with reference to preferred exemplary embodiments.

BRIEF DESCRIPTION OF THE DRAWINGS

In the drawings:

FIG. 1 shows a flexible tube which has a line attachment, sectioned longitudinally here, at its tube end which is illustrated here, wherein the sleeve-shaped front end region of said line attachment is designed as a union nut which, in its sleeve interior, bears an internal thread for attachment of the line attachment to an adjacent line portion, into which internal thread a sealing ring is inserted in the self-holding manner, FIG. 2 shows the line attachment of the tube shown in FIG. 1, likewise in a partially sectioned side view, FIG. 3 shows the sealing ring which is secured in a self-holding manner on the internal thread of the union nut, in a detailed longitudinal section in the partial region which is encircled in FIG. 2, FIG. 4 shows the union nut and the sealing ring in a detailed longitudinal section on the opposite side of the internal thread, which is provided on the inner circumference of the union nut, in the partial region enclosed in FIG. 2, FIG. 5 shows the line portion, which is shown here separately from the tube, in an extended perspective illustration of its components, wherein a screwing-in tool fitting the sealing ring is also shown here, FIGS. 6a and 6b show the sealing ring from FIGS. 1 to 5 in a top view (FIG. 6a) and in a perspective illustration (FIG. 6b), FIGS. 7a and 7b show a sealing ring which is likewise shown in a top view (FIG. 7a) and a perspective illustration (FIG. 7b) and here has, on its ring inner circumference, three indentations which are arranged at uniform distances from one another and serve as tool engagement surfaces, and FIGS. 8a and 8b show a sealing ring which is likewise illustrated in a top view (FIG. 8a) and a perspective illustration (FIG. 8b) in a design modified only slightly in relation to FIGS. 7a and 7b.

DETAILED DESCRIPTION OF THE PREFERRED EMBODIMENTS

FIGS. 1 to 3 illustrate a sanitary line attachment 1 which is equipped here as a tube attachment for a flexible water tube 2. The line attachment 1 has an attachment stub 3 with an attachment nipple 4, onto which one of the tube ends of the flexible tube line is pushed. The tube end is held on the attachment nipple 4 by means of a crimped compressive sleeve 5 which engages around the tube end of the water tube 2.

The line attachment 1 illustrated here has a sleeve-shaped front end region 6 which, in its sleeve interior, bears an internal thread 7 for attachment to an adjacent line portion (not shown specifically here). The sleeve-shaped front end region 6 is formed here by a union nut. Said union nut engages at its end region facing away from the internal thread 7 behind a ring step 8, which is provided on the attachment stub 3, in such a manner that, although the union nut is held on the attachment stub 3 rotatably, it is held immovably in the axial direction.

In order to seal the separating plane between the line attachment and the adjacent line portion, at least one sealing ring 9 is clamped in a sealing manner in the sleeve-shaped front end region 6, on the ring outer circumference of which sealing ring at least one holding projection 10, preferably at least two holding projections and in particular—as shown here—three holding projections 10 protrude(s). With said holding projections 10, the sealing ring 9 engages in the internal thread 7 in the sleeve interior of the sleeve-shaped front end region 6. The sealing ring 9 is produced from a dimensionally stable and/or inelastic material which does not permit the sealing ring 9 to be pressed into the sleeve-shaped front end region 6. The sealing ring 9 therefore has at least two indentations 11 which are arranged at a distance from one another on the ring inner circumference of the sealing ring 9 and serve as tool engagement surfaces for a screwing-in tool 12, which is depicted in more detail in FIG. 5. With the aid of said screwing-in tool 12, the sealing ring 9 can be screwed into the internal thread 7 in the sleeve-shaped front end region 6 of the line attachment 1 and can also be unscrewed again if required. After screwing into the internal thread 7, even the sealing ring 9 produced from dimensionally stable and/or inelastic material forms a seal which is self-holding there and can already be installed by the manufacturer, and therefore it is effectively prevented that the user fits said seal incorrectly or even not at all.

From a comparison of the detailed illustrations in FIGS. 3 and 4, it becomes clear that the sealing ring 9 has a thickness greater than a thread pitch of the internal thread 7 and preferably greater than/equal to two thread pitches of the internal thread 7. In this manner, the sealing ring 9 engages virtually completely with each of its holding projections 10 in at least one of the thread pitches, specifically in such a manner that the sealing ring 9 is secured in a self-holding manner in the internal thread 7 in a plane arranged approximately at a right angle to the longitudinal axis of the line attachment 1. It can also be seen from FIGS. 3 and 4 that the ring outer circumference of the sealing ring 9 is cuttable into the internal thread 7 at least with the at least one holding projection 10. The holding projections 10 are arranged distributed at uniform distances about the ring outer circumference of the sealing ring 9.

The sealing ring 9 is designed here as a fiber seal and is produced from a fiber material. The line attachment 1 is designed here as a tube attachment with a union nut, wherein the union nut forms the sleeve-shaped front end region 6 of the line attachment 1.

LIST OF DESIGNATIONS

1 line attachment
2 water tube
3 attachment stub
4 attachment nipple
5 compressive sleeve
6 sleeve-shaped front end region
7 internal thread
8 ring step
9 sealing ring
10 holding projection
11 indentations
12 screwing-in tool

The invention claimed is:

1. A sanitary line attachment (1), comprising a sleeve-shaped front end region (6), said sleeve-shaped front end region (6) including a sleeve interior that bears an internal thread (7) for attachment to an adjacent line portion, a sealing ring (9) produced from at least one of a dimensionally stable or inelastic material for sealing clamping between the line attachment and the adjacent line portion located in the sleeve-shaped front end region, the sealing ring (9) being a fiber seal or produced from a fiber material, a ring outer circumference of said sealing ring (9) including at least one protruding holding projection (10), said holding projection (10) engages in the internal thread (7) in the sleeve interior of the sleeve-shaped front end region (6), the sealing ring (9) further including at least two indentations (11) which form tool engagement surfaces arranged at a distance from one another on a ring inner circumference.

2. The sanitary line attachment as claimed in claim 1, wherein the sealing ring (9) has a thickness greater than a thread pitch of the internal thread (7).

3. The sanitary line attachment as claimed in claim 1, wherein the ring outer circumference of the sealing ring (9) cuts into the internal thread (7) at least with the at least one holding projection (10).

4. The sanitary line attachment as claimed in claim 1, wherein the at least one holding projection comprises at least two of the holding projections (10) on the ring outer circumference of the sealing ring (9).

5. The sanitary line attachment as claimed in claim 4, wherein the at least two holding projections (10) are arranged distributed at uniform distances around the ring outer circumference of the sealing ring (9).

6. The sanitary line attachment as claimed in claim 1, wherein the line attachment is a tube attachment and further comprises a union nut, and the union nut forms the sleeve-shaped front end region (6) of the line attachment (1).

7. The sanitary line attachment as claimed in claim 1, wherein the sealing ring (9) has a thickness greater than or equal to two thread pitches of the internal thread (7).

* * * * *